US006845413B2

(12) United States Patent
Denda et al.

(10) Patent No.: US 6,845,413 B2
(45) Date of Patent: Jan. 18, 2005

(54) SWITCHOVER DEVICE AND INFORMATION RECORDING/ REPRODUCING APPARATUS HAVING THE SWITCHOVER DEVICE

(75) Inventors: Akihiro Denda, Saitama-ken (JP); Yoshiya Nonaka, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 266 days.

(21) Appl. No.: 10/054,979

(22) Filed: Jan. 25, 2002

(65) Prior Publication Data

US 2002/0099882 A1 Jul. 25, 2002

(30) Foreign Application Priority Data

Jan. 25, 2001 (JP) ........................................ 2001-017352

(51) Int. Cl.[7] ................................................ G06F 3/00
(52) U.S. Cl. ........................................ 710/38; 710/306
(58) Field of Search ........................ 710/38, 306; 711/5; 455/186.1; 369/53.12; 379/88.25

(56) References Cited

U.S. PATENT DOCUMENTS

| | | | | |
|---|---|---|---|---|
| 5,349,699 A | * | 9/1994 | Erben et al. | 455/186.1 |
| 5,485,443 A | * | 1/1996 | Niwayama | 369/53.12 |
| 5,524,139 A | * | 6/1996 | Jones | 379/88.25 |
| 5,568,453 A | | 10/1996 | Okada | |
| 5,633,837 A | | 5/1997 | Gantt | |
| 5,659,367 A | * | 8/1997 | Yuen | 348/465 |
| 5,774,798 A | * | 6/1998 | Gaskill | 455/186.1 |
| 6,016,432 A | | 1/2000 | Stein | |
| 6,018,504 A | * | 1/2000 | Sakamoto et al. | 369/7 |
| 6,072,753 A | * | 6/2000 | Ashenafi | 369/7 |
| 6,078,984 A | * | 6/2000 | Bubeck | 711/5 |
| 6,112,271 A | * | 8/2000 | Lanus et al. | 710/306 |
| 6,240,280 B1 | * | 5/2001 | Ravi et al. | 455/161.1 |

FOREIGN PATENT DOCUMENTS

| | | |
|---|---|---|
| DE | 199 25 581 A1 | 12/2000 |
| EP | 0 593 024 A2 | 4/1994 |
| EP | 0 901 248 A2 | 3/1999 |
| JP | 60050785 | 3/1985 |

* cited by examiner

*Primary Examiner*—Jeffrey Gaffin
*Assistant Examiner*—Harold Kim
(74) *Attorney, Agent, or Firm*—Arent Fox PLLC (57) ABSTRACT

An improved switchover device includes input terminals connected with information sources, first and second output terminals connected with information processing devices, switching elements for effecting switchover connection between the input terminals and the output terminals and a switchover control circuit for controlling the switching elements. When information from one information source is being supplied to the information processing devices and there is an interrupt request for supplying information from another information source devices, the switching element between the input terminal of the one information source and the first output terminal is made OFF, while the switching element between the input terminal of the other information source and the first output terminal is made ON. The switching element between the input terminal of the one information source and the second output terminal is kept ON. Thus, the information processing devices are allowed to respectively process information from a plurality of information sources.

3 Claims, 8 Drawing Sheets

| | | | |
|---|---|---|---|
| SELECT AUDIO REPRODUCING/OUTPUTTING SECTION | SELECT OPTICAL DISC REPRODUCING SECTION | SWa1 : (ON) | SWa2, SWa3, SWa4, SWb1~SWb4 : (OFF) |
| | SELECT MD REPRODUCING SECTION | SWa2 : (ON) | SWa1, SWa3, SWa4, SWb1~SWb4 : (OFF) |
| | SELECT CASSETTE REPRODUCING SECTION | SWa3 : (ON) | SWa1, SWa2, SWa4, SWb1~SWb4 : (OFF) |
| | SELECT RECEPTION TUNER | SWa4 : (ON) | SWa1, SWa2, SWa4, SWb1~SWb4 : (OFF) |
| SELECT RECORDING SECTION | SELECT OPTICAL DISC REPRODUCING SECTION | SWa1, SWb1 : (ON) | SWa2, SWa3, SWa4, SWb2, SWb3, SWb4 : (OFF) |
| | SELECT MD REPRODUCING SECTION | SWa2, SWb2 : (ON) | SWa1, SWa3, SWa4, SWb1, SWb3, SWb4 : (OFF) |
| | SELECT CASSETTE REPRODUCING SECTION | SWa3, SWb3 : (ON) | SWa1, SWa2, SWa4, SWb1, SW2, SWb4 : (OFF) |
| | SELECT RECEPTION TUNER | SWa4, SWb4 : (ON) | SWa1, SWa2, SWa3, SWb1, SWb2, SWb3 : (OFF) |

| | a | b | c | d | AUDIO REPRODUCING/OUTPUTTING SECTION | RECORDING SECTION |
|---|---|---|---|---|---|---|
| OPERATION MODE 1 | ON | OFF | OFF | OFF | REPRODUCING/OUTPUTTING (1) | RECORDING (1) |
| OPERATION MODE 2 | OFF | ON | OFF | OFF | REPRODUCING/OUTPUTTING (2) | RECORDING (2) |
| OPERATION MODE 3 | OFF | OFF | ON | OFF | REPRODUCING/OUTPUTTING (3) | RECORDING (3) |
| OPERATION MODE 4 | OFF | OFF | OFF | ON | REPRODUCING/OUTPUTTING (4) | RECORDING (4) |

SWITCHOVER DEVICE AND INFORMATION RECORDING/ REPRODUCING APPARATUS HAVING THE SWITCHOVER DEVICE

BACKGROUND OF THE INVENTION

1. Field of the Invention

The present invention relates to a switchover device for switching over and sending information transmitted from a plurality of information sources to a plurality of information processing devices. This invention also relates to an information recording/reproducing apparatus equipped with the switchover device.

The present application claims priority from Japanese Application No. 2001-17352, the disclosure of which is incorporated herein by reference for all purposes.

2. Description of the Related Prior Art

Figure 7:
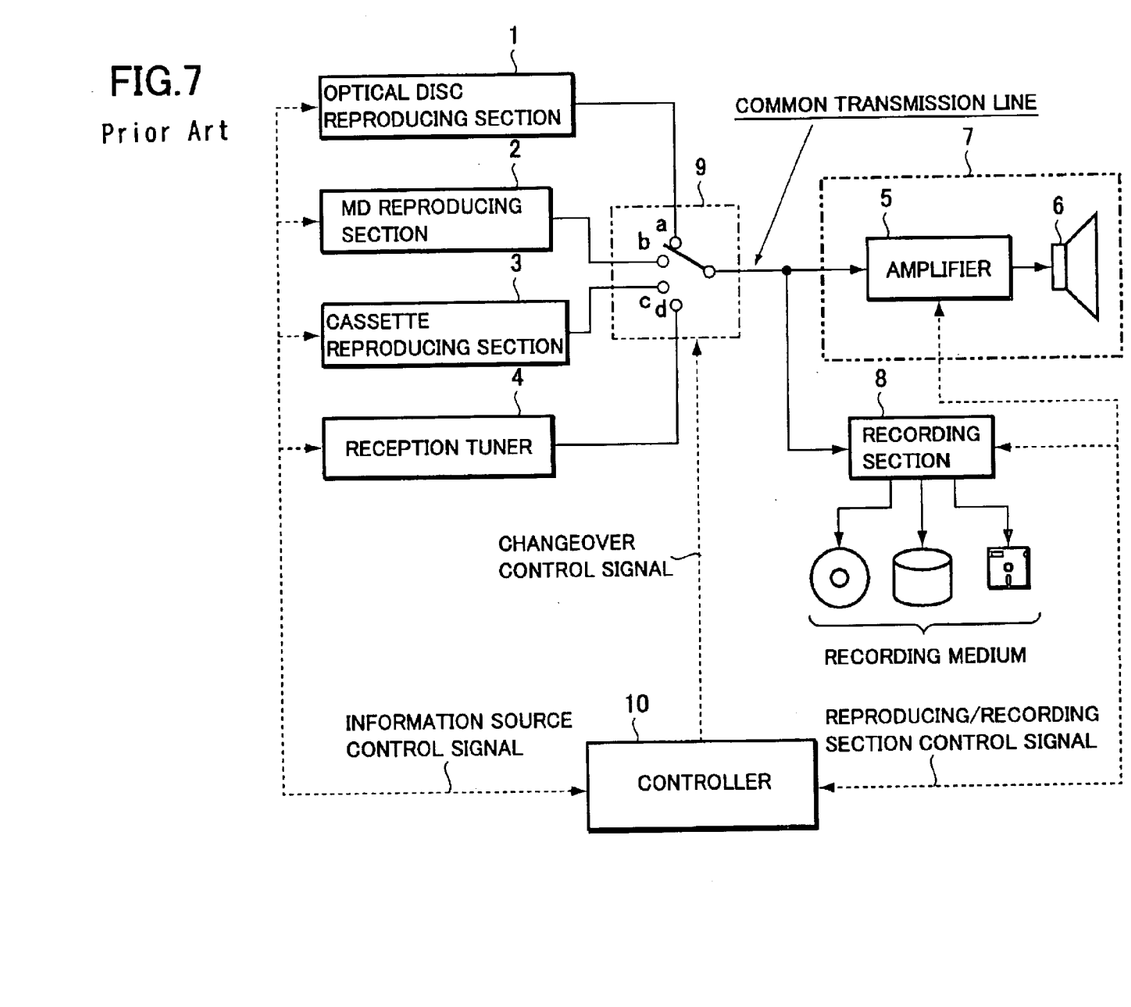
FIG. 7 is a block diagram showing how a conventional switchover device is used.

FIG. 7 is a block diagram showing a conventional audio apparatus serving as an information recording/reproducing apparatus containing a plurality of information sources and a plurality of information processing devices.

As shown in FIG. 7, the conventional audio apparatus has a plurality of information sources including an optical disc reproducing section 1 for reproducing audio information recorded on an optical disc, an MD (Mini Disc) reproducing section 2 for reproducing information recorded on an MD, a cassette reproducing section 3 for reproducing information magnetically recorded on a cassette tape, and a reception tuner 4 for receiving broadcast electric wave.

The conventional audio apparatus also has a plurality of information processing devices for processing audio information transmitted from the information sources 1–4. In fact, the information processing devices include an audio reproducing/outputting section 7 having an amplifier 5 for amplifying an audio information supplied thereto, also include a speaker 6 for converting the audio information into a sound having an audible frequency. The information processing devices further include a recording section 8 for recording the received audio information on other recording mediums such as hard disk, MD, writable CD and DVD.

Further, conventional audio apparatus also has a plural-input/one-output type switchover device 9 for supplying the audio information transmitted from the information sources 1–4 to the audio reproducing/outputting section 7 and the recording section 8. Meanwhile, a controller 10 is provided to control the switching operation of the switchover device 9 in accordance with user's requirements. In detail, the switchover device 9 has a plurality of input contacts a–d individually connected to the respective outputs of the information sources 1–4, arranged in a manner such that only one input contact at each instant in time can be exclusively switched to the output contact in accordance with an instruction fed from the controller 10.

Figure 8:
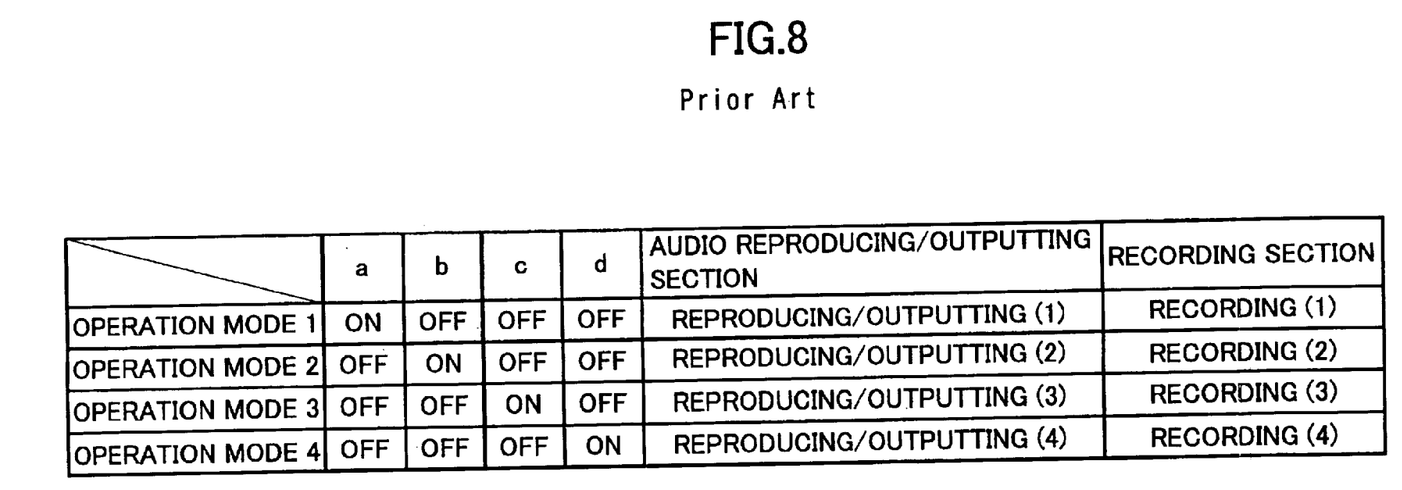
FIG. 8 is a function table showing an operation of the conventional switchover device.

An operation of the conventional audio apparatus will be described below with reference to a function table shown in FIG. 8. As shown in the function table, during "operation mode 1", once the switchover device 9 is connected with the input contact a, other input contacts b–d will be OFF. As a result, an audio information transmitted from the optical disc reproducing section 1 serving as an information source is supplied to a transmission line through the input contact a, so as to be supplied to the audio reproducing/outputting section 7 and the recording section 8. In this way, an audio information reproduced in the optical disc reproducing section 1 may be converted into an audible sound in the audio reproducing/outputting section 7, thereby allowing a user to enjoy the reproduced sound and at the same time to record the audio information on a desired recording medium in the recording section 8.

In "operation mode 2", "operation mode 3" and "operation mode 4", the input contacts b–d may also be switched individually and exclusively, thereby allowing any audio information fed from any of the information sources 2–4 to be converted into an audible sound in the audio reproducing/outputting section 7, thus allowing a user to enjoy the reproduced sound and at the same time to record the audio information on a desired recording medium in the recording section 8.

However, since the above-described conventional audio apparatus employs a plural-input/one-output type switchover device 9, only one transmission line (common transmission line for both reproducing/outputting and recording) is connected between the output contact on one hand and the audio reproducing/outputting section 7 as well as the recording section 8 on the other.

Namely, an audio information fed from the output contact of the switchover device 9 is transmitted through the common transmission line to the amplifier 5 of the reproducing/outputting section 7 as well as to the recording section 8. Consequently, an audio information transmitted from one information source (such as optical disc reproducing section 1) may be supplied through the common transmission line to the reproducing/outputting section 7 and to the recording section 8, thereby reproducing/outputting the sound and at the same time recording the outputted sound.

However, there is a restriction that the sound reproducing/outputting and sound recording are allowed to be performed only for an audio information transmitted from only one specific information source among the four information sources 1–4. Because of such restriction, it is impossible for a user to record one audio information transmitted from one information source (such as the optical disc reproducing section 1) and at the same time to reproduce/output another audio information transmitted from another information source (such as the reception tuner 4).

If the above problem is discussed in more detail, it is allowed to take for example a car stereo apparatus having an RDS information receiving function.

Namely, in the case where a car audio apparatus is mounted within a car, a user is allowed to switch ON the input contact a of the switchover device 9, so that an audio information such as a music recorded in an optical disc is reproduced in the optical disc reproducing section 1. Then, the audio information can be reproduced/outputted in the reproducing/outputting section 7 and at the same time recorded in the recording section 8. At this time, if another information source (which might be the reception tuner 4) operates to receive an RDS wave containing traffic information and supply the received RDS information to the user, the controller 10 is required to operate to turn-on the switchover device 9 with respect to the input contact d.

That is, when the reception tuner 4 receives an RDS electric wave and the controller 10 operates to forcibly turn-on the switchover device 9 with respect to the input contact d in order that the RDS information can be reproduced and outputted in the audio reproducing/outputting section 7, since the supply of the audio information from the optical disc reproducing section 1 to the recording section 8 is stopped, it is impossible to continue the recording of the audio information, thus bringing about an inconvenience to the user.

On the other hand, even if the user tries to continue the information recording in the recording section 8, he or she has to perform some additional operations (not shown) and give instructions to the controller 10 in order that the switchover device 9 can be forcibly turned from its ON state with the input contact d to its another ON state with the input contact a.

Moreover, if the user tries to continue the information recording and the switchover device 9 is forcibly turned to its ON state with the input contact a, it is impossible for the user to obtain RDS information (which is a useful traffic information). In other words, at any instant in time the user is allowed to have only one selection, i.e., either to continue the information recording by giving up RDS information, or to obtain RDS information by giving up the information recording, causing the user to have an inconvenient feeling.

SUMMARY OF THE INVENTION

It is an object of the present invention to provide an improved switchover device for switching over and sending information transmitted from a plurality of information sources to a plurality of information processing devices. Another object of the invention is to provide an improved information recording/reproducing apparatus containing the improved switchover device.

According to a first aspect of the invention, there is provided a switchover device for effecting a switchover control among a plurality of information sources as well as among a plurality of information processing devices, such that information transmitted from the plurality of information sources are supplied to the plurality of information processing devices in a predetermined manner, the switchover device comprising: a plurality of input terminals connected with the plurality of information sources; a first output terminal and a second output terminal connected with the plurality of information processing devices; a switchover connection device for effecting a switchover connection between the plurality of input terminals on one hand and the first, second output terminals on the other; and a switchover control device for controlling the switchover of the switchover connection device. In particular, during a process in which an information transmitted from one information source is supplied to the plurality of information processing devices, once there is an interrupt request for supplying an information transmitted from another information source to the information processing devices, the switchover control device operates to control the switchover connection device to stop a connection between the first output terminal and one input terminal connected with said one information source, and to form a connection between the first output terminal and another input terminal connected with said another information source, further to keep a connection between the second output terminal and an input terminal connected with said one information source.

Specifically, the switchover control device has a memory for storing a switchover connection state of the switchover connection device when one information transmitted from said one information source is supplied to the plurality of information processing devices, and is provided such that once the interrupt request is cancelled, the switchover control device operates to return the switchover connection device to its former state (a state existing prior to the occurrence of the interrupt request) in accordance with a switchover connection state stored in the memory.

Using the switchover device having the above-described constitution makes it possible to obtain the following advantages. Namely, dining a process in which an information transmitted from one information source is supplied to the plurality of information processing devices, once there is an interrupt request for supplying another information (transmitted from another information source) to the information processing devices, the switchover connection device is controlled so as to continue the supply of the information to the an information processing device connected with the second output terminal, while an information processing device connected with the first output terminal is switched over to said another information source (in relation to the interrupt request). During the above switchover connection, a connection between the first output terminal and one input terminal connected with said one information source is interrupted, while the first output terminal and another input terminal connected with said another information source are connected with each other.

In this way, when there is an interrupt request, said another information source in relation to the interrupt request is supplied to an information processing device in connection with the first output terminal, while the information from said one information source is continued to be supplied to the information processing device connected with the second output terminal. Therefore, in the case where the switchover device of the present invention is used in an electronic apparatus having an information processing device for processing new information in accordance with an interrupt request, also having an information processing device which does not change information (to be processed) even if there is an interrupt request, thereby making it possible to perform an appropriate switchover control.

Further, once the interrupt request is cancelled, the switchover connection device can be returned back to its former state (a state existing before the occurrence of the interrupt request), thereby making it possible to dispense with a troublesome operation for resetting a switchover connection state for the switchover connection device.

According to another aspect of the invention, there is provided an information recording/reproducing apparatus equipped with a switchover device recited in claim 1, wherein an information processing device connected with the first output terminal is an audio reproducing/outputting device for audio-reproducing/outputting an information, an information processing device connected with the second output terminal is a recording device for recording an information, an information source in relation with an interrupt request is a signal reception device.

In the case where the switchover device having the above-described constitution is used in an information recording/reproducing apparatus such as a car audio apparatus, during a process in which an information transmitted from a certain information source is audio-reproduced/outputted in an audio reproducing/outputting device (connected with the first output terminal) and at the same time recorded by virtue of a recording device (connected with the second output terminal), once the reception device receives an RDS information, such an RDS information may be reproduced/outputted by the audio reproducing/outputting device, thereby allowing the recording device to continue the recording of the information transmitted from said certain information source.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENT

Figure 1:
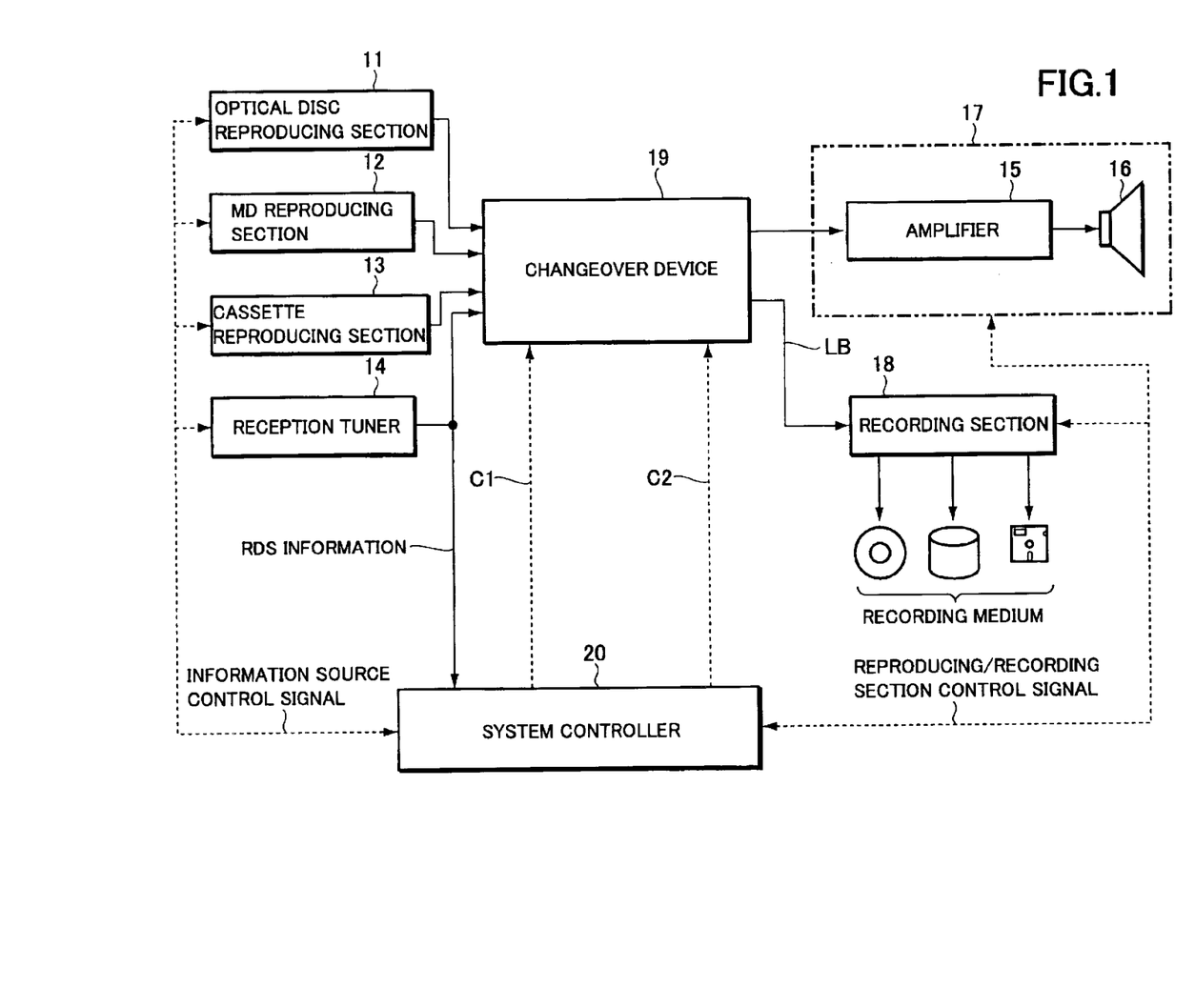
FIG. 1 is a block diagram showing how the switchover device formed according to an embodiment of the present invention can be used.
Figure 2:
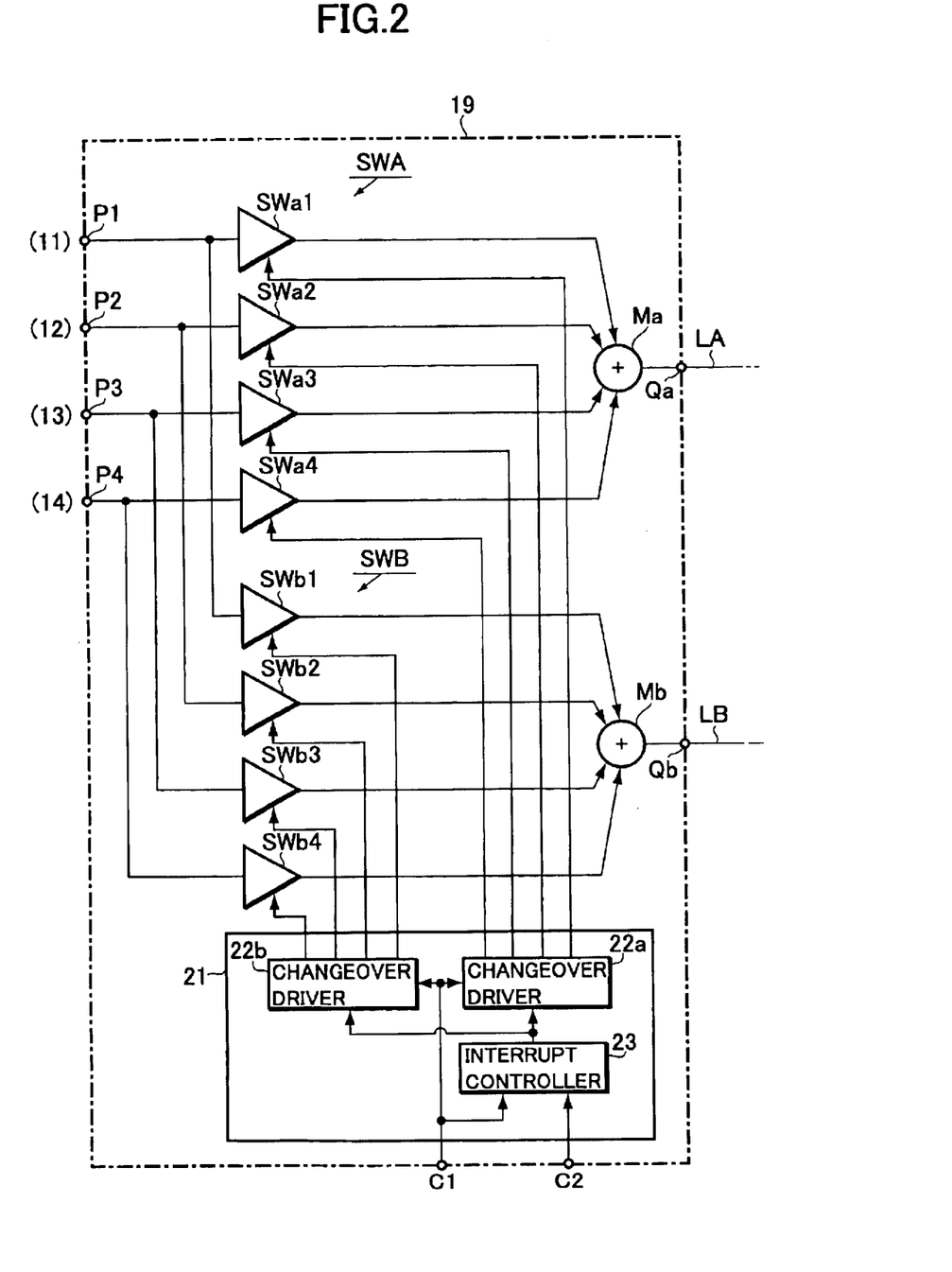
FIG. 2 is a block diagram showing in detail the constitution of the switchover device formed according to the embodiment.

An embodiment of the present invention will be described below with reference to the accompanying drawings. FIG. 1 and FIG. 2 are block diagrams which show the construction of an improved switchover device formed according to the present invention. However, the following description will be focused on a switchover device installed within an information recording/reproducing apparatus such as a car audio apparatus.

As shown in FIG. 1, the audio apparatus of the present invention has a plurality of information sources including an optical disc reproducing section 11 for reproducing audio information recorded on an optical disc such as CD or DVD, an MD reproducing section 12 for reproducing information recorded on an MD (Mini Disc), a cassette reproducing section 13 for reproducing information magnetically recorded on a cassette tape, and a reception tuner 14 for receiving broadcast electric wave. In fact, these information sources act as different components selectable in accordance with user's request.

Further, an audio reproducing/outputting section 17 is provided for reproducing and thus outputting audio information transmitted from the information sources 11–14, while a recording section 18 is provided for recording the audio information transmitted hereto.

The audio reproducing/outputting section 17 includes an amplifier 15 for electrically amplifying an audio information (audio signal) supplied from a switchover device 19 through a reproducing side transmission line LA, a speaker 16 for producing an amplified audio signal outputted from the amplifier 15.

The recording section 18 is provided for recording an audio information (audio signal), which is supplied from a switchover device 19 through a recording side transmission line LB, on a recording medium such as a hard disk, an MD, a recordable CD and a recordable DVD.

As shown in FIG. 1, the switchover device 19 is provided between the information sources 11–14 and the information processing devices 17, 18, by virtue of the reproducing side transmission line LA and the recording side transmission line LB. In fact, the switchover device 19 operates in accordance with an instruction issued by a system controller 20, to connect the information sources 11–14 with the information processing devices 17, 18 by way of the reproducing side transmission line LA and the recording side transmission line LB.

The system controller 20 is provided so that once the reception tuner 14 receives RDS information by receiving RDS electric wave, an interrupt control signal C2 will be supplied by the system controller 20 to the switchover device 19 so as to effect a desired switchover operation. In this way, the RDS information such as traffic information outputted from the reception tuner 14 may be audio-reproduced/outputted in the audio reproducing/outputting section 17.

The construction of the switchover device 19 will be described in more detail with reference to FIG. 2. As shown in FIG. 2, the switchover device 19 comprises a plurality of input terminals P1–P4 connected with the plurality of information sources 11–14, a switching circuit SWA including a plurality of switching elements SWa1–SWa4, another switching circuit SWB including a plurality of switching elements SWb1–SWb4, an adder Ma, an adder Mb, a switchover control circuit 21 for controlling ON/OFF of the switching elements SWa1–SWa4 and SWb1–SWb4.

Here, the switching elements SWa1–SWa4 and SWb1–SWb4 are formed by tristate buffer amplifiers or analogue switches or mechanical type micro switches, all capable of being ON or OFF in accordance with the logical levels of switchover driving signals fed from the switchover control circuit 21.

Further, the respective input terminals of the switching elements SWa1–SWa4 and SWb1–SWb4 are arranged in a manner such that each switching element SWa is connected in parallel with a corresponding switching element SWb, the output terminals of the switching elements SWa1–SWa4 are connected to the input terminal of the adder Ma, while the output terminals of the switching elements SWb1–SWb4 are connected to the input terminal of the adder Mb.

In this way, the switchover device 19 shown in FIG. 2 includes the switching circuit SWA and the switching circuit SWB, thereby forming an arrangement of four-input two-output type switching circuit.

Specifically, the input terminals of the switching elements SWa1 and SWb1 are connected with the output terminal of the optical disc reproducing section 11, the input terminals of the switching elements SWa2 and SWb2 are connected with the output terminal of the MD reproducing section 12, the input terminals of the switching elements SWa3 and SWb3 are connected with the output terminal of the cassette reproducing section 13, the input terminals of the switching elements SWa4 and SWb4 are connected with the output terminal of the reception tuner section 14, by way of the respective input terminals P1–P4.

Further, the reproducing side transmission line LA is connected to the output terminal Qa (first output terminal of the switchover device) of the adder Ma of the switching circuit SWA, while the recording side transmission line LB is connected to the output terminal Qb (second output terminal of the switchover device) of the adder Mb of the switching circuit SWB.

The switchover control circuit 21 includes a switchover driving section 22a for switching-over the switching elements SWa1☐SWa4 of the switching circuit SWA, a switchover driving section 22b for switching-over the switching elements SWb1☐SWb4 of the switching circuit SWB, and an interrupt control section 23, thereby effecting the switchover control of the switching elements SWa1–SWa4 and SWb1–SWb4 in accordance with the switchover control signal C1 and the interrupt control signal C2 fed from the system controller.

Here, the switchover control signal C1 is supplied to the switchover driving sections 22a and 22b as well as the interrupt control section 23, while the interrupt control signal C2 is supplied to the interrupt control section 23.

When a user operates the operation section (not shown) to select one of the information sources 11–14 and one of the information processing devices 17 and 18, the system controller 20 will operate to supply a switchover control signal C1 (specifying a selected information source and a selected information processing device) to the switchover driving sections 22a and 22b, thereby effecting a desired switchover among the switching elements SWa1–SWa4 as well as among the switching elements SWb1–SWb4.

Figure 3:
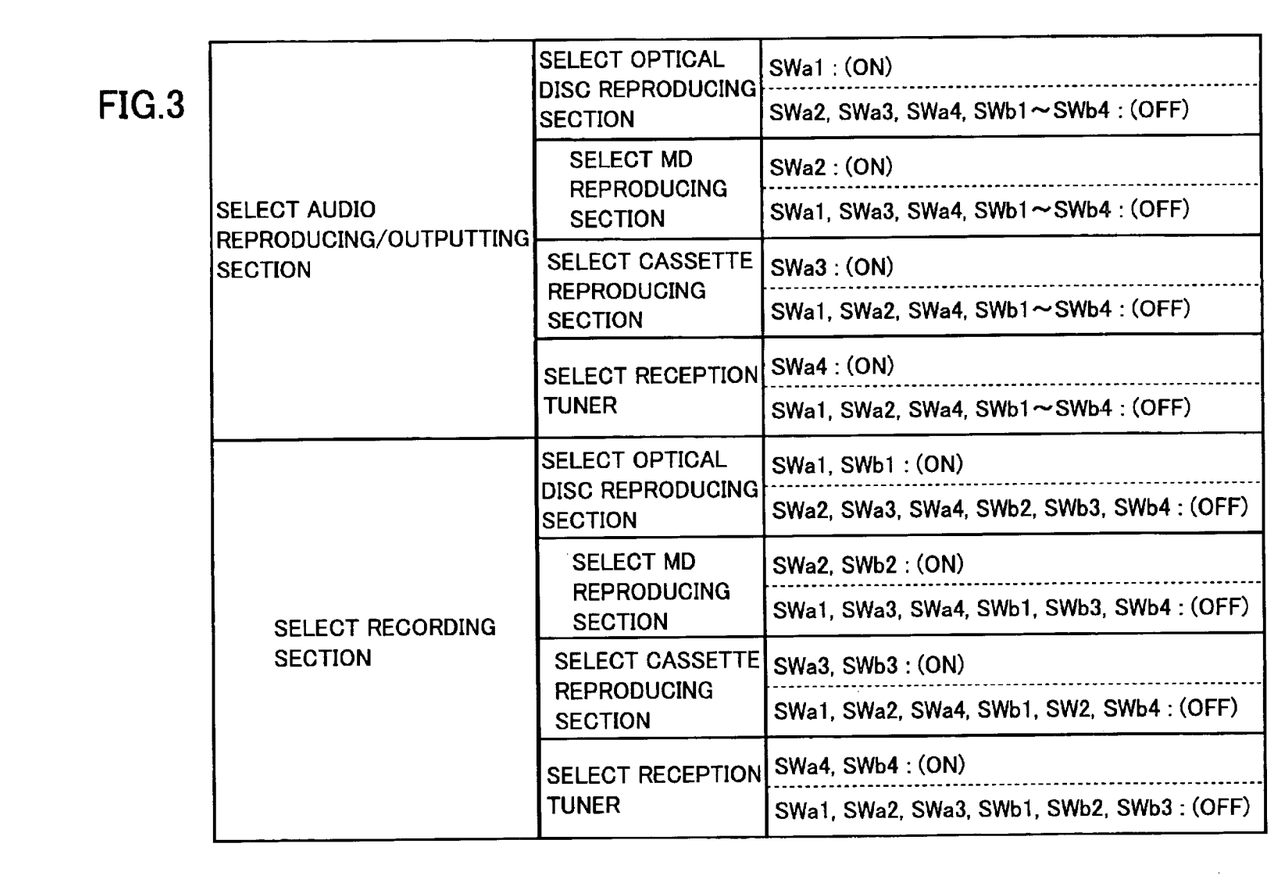
FIG. 3 is a function table showing the operation of the switchover device formed according to the embodiment.

In detail, as shown in FIG. 3 (which is a function table), when a user selects the audio reproducing/outputting section 17 and one of the information sources 11–14, the switching elements SWa1–SWa4 and the switching elements SWb1–SWb4 will be properly switched in a manner such that only the audio reproducing/outputting process using the audio reproducing/outputting section 17 is performed, but not performing the recording in the recording section 18. In other words, when the audio reproducing/outputting section 17 is selected, the switching elements SWb1–SWb4 of the switching circuit SWB will all be made OFF, thereby preventing the supply of the audio information from the information sources 11–14 to the recording section 18 through the recording side transmission line LB. As to the switching elements SWa1–SWa4 of the switching circuit SWA, only one switching element connected with the selected information source is made ON.

For example, as shown in FIG. 3, when the audio reproducing/outputting section 17 and the optical disc reproducing section 11 have been selected, only the switching element SWa1 of the switching circuit SWA is made ON, while the remaining elements SWa2, SWa3 and SWa4 are made OFF. Meanwhile, the switching elements SWb1–SWb4 of the switching circuit SWB are all made OFF, thereby allowing an audio information transmitted from the optical disc reproducing section 11 to be supplied to the audio reproducing/outputting section 17 via the switching element SWa1 and the adder Ma as well as the reproducing side transmission line LA. At this time, the same audio information is prevented from being supplied to the recording section 18.

However, the above description can also be used to similarly explain the switching actions of the switching elements SWa1–SWa4 and the switching elements SWb1–SWb4 (in a manner shown in FIG. 3) when the audio reproducing/outputting section 17 as well as any one of the MD reproducing section 12 and the cassette reproducing section 13 and the reception tuner 14 are selected.

Further, when a user selects the audio reproducing/outputting section 17 and the recording section 18 as well as one of the information sources 11–14, the switchover driving sections 22a and 22b will operate in accordance with the switchover control signal C1 to effect desired switchover operation among the switching elements SWa1–SWa4 and the switching elements SWb1–SWb4 so as to simultaneously perform the audio reproducing/reproducing by the audio reproducing/outputting section 17 and the recording by the recording section 18. In other words, once the audio reproducing/outputting section 17 and the recording section 18 are selected, a pair of (two) switching elements (connected with a selected information source) among the switching elements SWa1–SWa4 and the switching elements SWb1–SWb4 are made ON, while the remaining switching elements are made OFF. In this way, an audio information from a selected information source may be supplied to the audio reproducing/outputting section 17 via the reproducing side transmission line LA and to the recording section 18 via the recording side transmission line LB.

For example, as shown in FIG. 3, when the audio reproducing/outputting section 17 and the recording section 18 as well as the optical disc reproducing section 11 are selected, the two switching elements SWa1 and SWb1 connected with the optical disc reproducing section 11 are made ON, while the remaining switching elements SWa2, SWa3, SWa4, SWb2, SWb3 and SWb4 not connected with the optical disc reproducing section 11 are made OFF, thereby supplying the audio information transmitted from the optical disc reproducing section 11 to both the audio reproducing/outputting section 17 and the recording section 18.

In fact, the above description can also be used to similarly explain the switching actions of the switching elements SWa1–SWa4 and the switching elements SWb1–SWb4 (in the manner shown in FIG. 3) when the audio reproducing/outputting section 17 as well as any one of the MD reproducing section 12 and the cassette reproducing section 13 and the reception tuner 14 are selected, thereby supplying the audio information transmitted from the selected information source to both the audio reproducing/outputting section 17 and the recording section 18.

The interrupt control section 23 has a storage memory (not shown) and can investigate the switchover state of the switching elements SWa1–SWa4 and the switching elements SWb1–SWb4 in accordance with the switchover control signal C1, thereby storing data indicating the switchover state (hereinafter, referred to as switchover state data) in the storage memory. In this way, it is possible to store, as the switchover state data, connection relations between the information sources 11–14 on one hand and the audio reproducing/outputting section 17 as well as the recording section 18 (all selected by the user) on the other.

Further, the interrupt control section 23 is provided such that once the reception tuner 14 receives an RDS electric wave and thus an interrupt control signal C2 is supplied from the system controller 20, it (interrupt control section 23) issues an instruction to the switchover driving section 22a in order that the switching element SWa4 (of the switching circuit SWA) connected with the output terminal of the reception tuner 14 is made ON, while the remaining switching elements SWa1, SWa2, SWa3 are made OFF. On the other hand, the switching elements SWb1–SWb4 of the switching circuit SWB are kept as such without being operated (not switched) with respect to switchover driving section 22b.

Therefore, as described in accordance with FIG. 3, during a process in which only an audio reproducing/outputting using the audio reproducing/outputting section 17 is performed and the recording using the recording section 18 is not performed, since the switching element SWa4 becomes ON once the interrupt control signal C2 is supplied hereto, only RDS information transmitted from the reception tuner 14 will be supplied to the audio reproducing/outputting section 17, making it sure to provide the user with RDS information such as traffic information. At this time, the recording operation using the recording section 18 is in its stopped state.

Further, during a process in which an audio information transmitted from a certain information source (such as the optical disc reproducing section 11) is recorded in the recording section 18 and an audio reproducing/outputting is performed in the audio reproducing/outputting section 17, since the switching element SWa4 becomes ON once the interrupt control signal C2 is supplied hereto, the supply of the audio information transmitted from the certain information source (such as the optical disc reproducing section 11) which has been connected with the audio reproducing/outputting section 17 will be stopped. At this time, only RDS information transmitted from the reception tuner 14 will be supplied to the audio reproducing/outputting section 17. Moreover, since the switching elements SWb1–SWb4 of the switching circuit SWB are kept unchanged (without being operated), an audio information from the information source (such as the optical disc reproducing section 11) connected with the recording section 18 is continued to be supplied to the recording section 18. Namely, in the case where the audio reproducing/outputting section 17 and the recording section 18 are both in operation, when an interrupt control signal C2 is supplied hereto, the audio reproducing/outputting section 17 will be switched over in its operation state so as to reproduce/output only RDS information. On the other hand, the recording section 18 is allowed to continue its recording operation without being unfavorably affected to any extent.

Then, once the reception tuner 14 has finished receiving RDS electric wave, an interrupt releasing instruction will be issued by the system controller 20 and fed to the interrupt controller 23 in accordance with an interrupt control signal C2. In this way, the interrupt controller 23 issues instructions to the switchover driving sections 22a and 22b, acting in accordance with the aforementioned switchover state data so as to allow the switching elements SWa1–SWa4 and SWb1–SWb4 to return back to their former states (states existing prior to the occurrence of the interrupt request). Accordingly, once an interrupt occurs due to an interrupt control signal C2, RDS information can be supplied to the user. On the other hand, once the supply of RDS information is finished, the interrupt controller will return back to its former operation selected by the user.

An operation of the switchover device having the above-described constitution will be described below with reference to flowcharts shown in FIGS. 4 and 5.

However, the following description will be focused on an example in which when an audio information transmitted from the optical disc reproducing section 11 (in accordance with a user's selection instruction) is reproduced/outputted by the audio reproducing/outputting section 17 and at the same time recorded by the recording section 18, the reception tuner 14 operates to receive RDS electric wave, while the system controller 20 issues an interrupt instruction to the switchover device 19.

Figure 4:
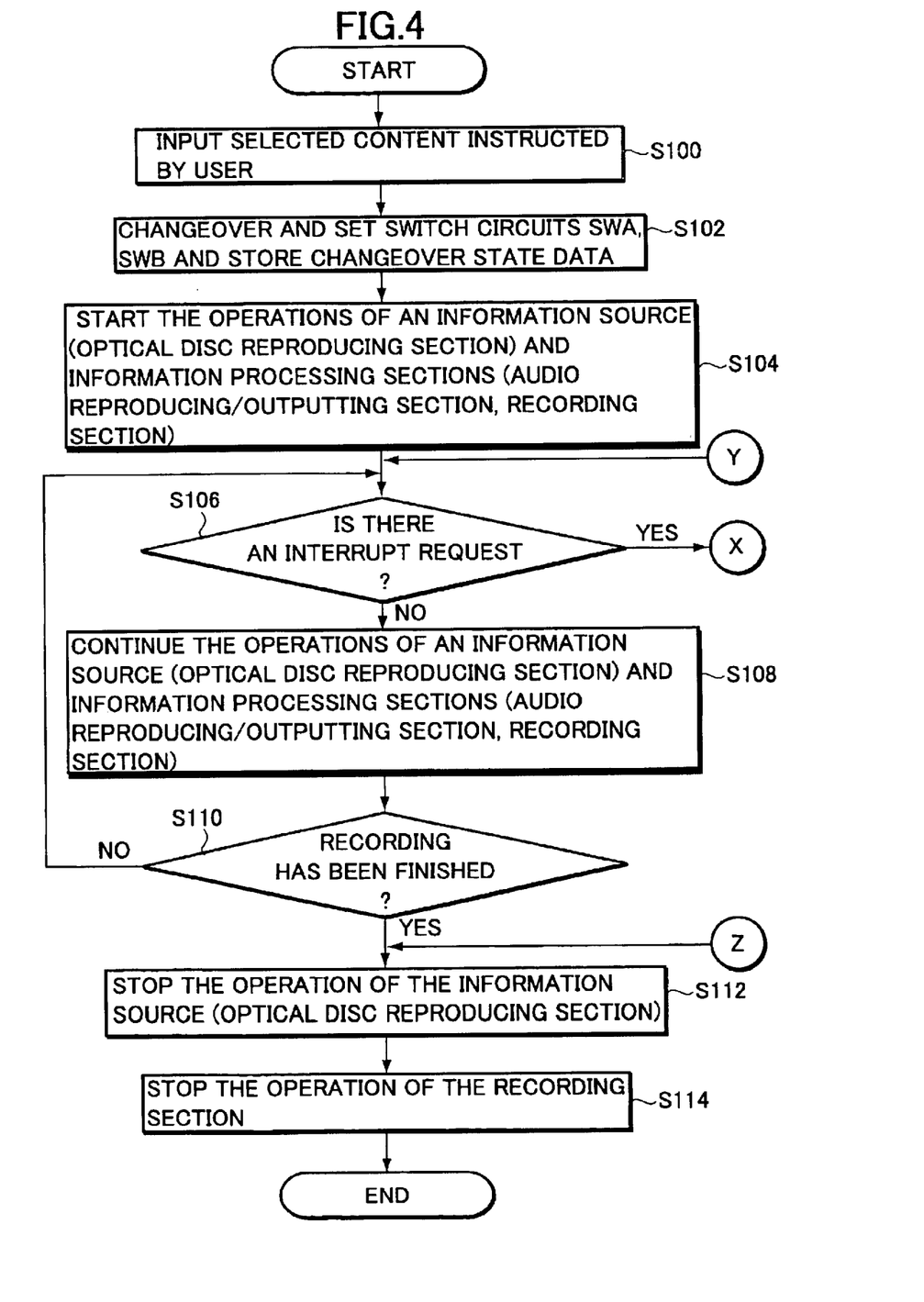
FIG. 4 is a flowchart showing the operation of the switchover device formed according to the embodiment.

Referring to FIG. 4, once a user operates the operation section (not shown) at step S100 to select an information source and an information processing section, the system controller 20 operates to input the selected contents into itself and output a switchover control signal C1.

At step S102, the switching elements SWa1–SWa4 and the switching elements SWb1–SWb4 of the switching circuits SWA and SWB are switched over in accordance with the switchover control signal C1. Namely, once the user performs his or her selection so that the optical disc reproducing section 11 is selected and the audio reproducing/outputting section 17 as well as the recording section 18 are operated, the switching element SWa1 and the switching element SWb1 of the switching circuits SWA and SWB become ON while the remaining switching elements SWa2–SWa4 and SWb2–SWb4 become OFF, in a manner shown in FIG. 6A.

Then, the interrupt controller 23 operates to investigate the switchover state of the switching elements SWa1–SWa4 and SWb1–SWb4, and store the switchover state data indicating the switchover state in a predetermined memory.

Next, at step S104, the system controller 20 operates to output an information source control signal (shown in FIG. 1) to start the operation of a selected information source (such as the optical disc reproducing section 11). Meanwhile, the system controller 20 operates to output a reproducing/recording section control signal to start the operations of the reproducing/outputting section 17 and the recording section 18.

In this way, the switchover device 19 can operate to supply an audio information transmitted from the optical disc reproducing section 11 to the reproducing/outputting section 17 via the reproducing side transmission line LA, and to the recording section 18 via the recording side transmission line LB. Then, the reproducing/outputting section 17 converts the audio information into an actual sound, while the recording section 18 starts the recording of the audio information.

Subsequently, during a process when the reproducing/outputting section 17 and the recording section 18 are all in operation, it is determined whether the reception tuner 14 has received RDS electric wave, i.e., whether there is an interrupt request represented by an interrupt control signal C2 fed from the system controller 20.

Here, if there is not such an interrupt request (NO), it is allowed to continue (at step S108) the operations of the information source (the optical disc reproducing section 11) and the information processing sections (the audio reproducing/outputting section 17 and the recording section 18), without having to switchover the switching elements SWa1–SWa4 and SWb1–SWb4.

Then, at step S110, the outputting of the audio information from the information source (optical disc reproducing section 11) is finished, while the system controller 20 determines whether there is an output of a signal indicating that the recording in the recording section 18 has finished. If the recording has not finished (NO), the process beginning with the step S106 is repeated.

Further, if it is determined at step S110 that the recording has finished (YES), the program proceeds to step S112 to stop the operation of the information source (the optical disc reproducing section 11). Then, the process proceeds to step S114 to stop the operation of the recording section 18. In this way, the recording operation and a series of audio reproducing/outputting (which have been performed simultaneously) are terminated.

Figure 5:
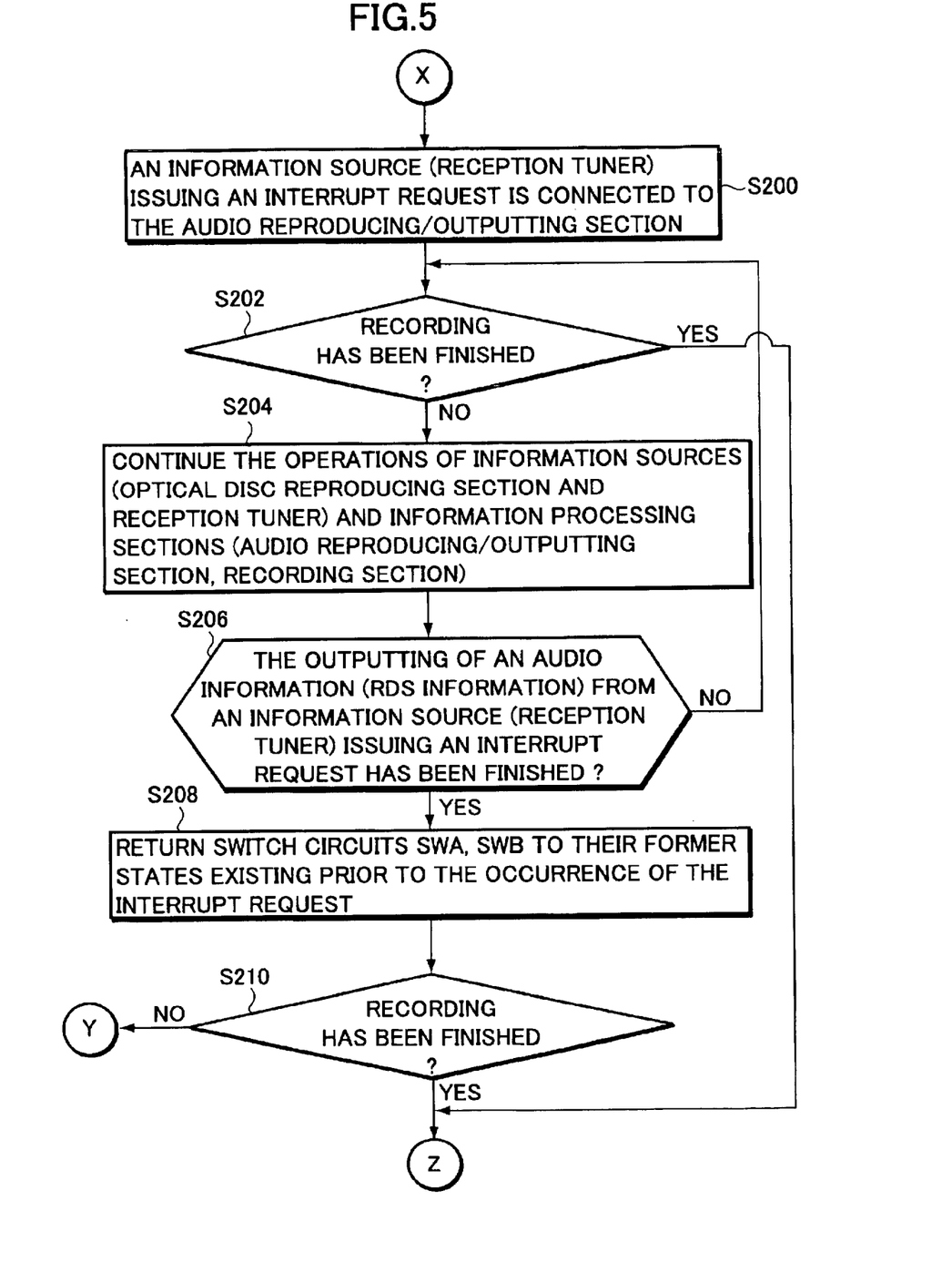
FIG. 5 is a flowchart showing in more detail the operation of the switchover device formed according to the embodiment.

Next, if it is determined at step S106 that there is an interrupt request (YES), the program proceeds to step S200 shown in FIG. 5.

Figure 6:
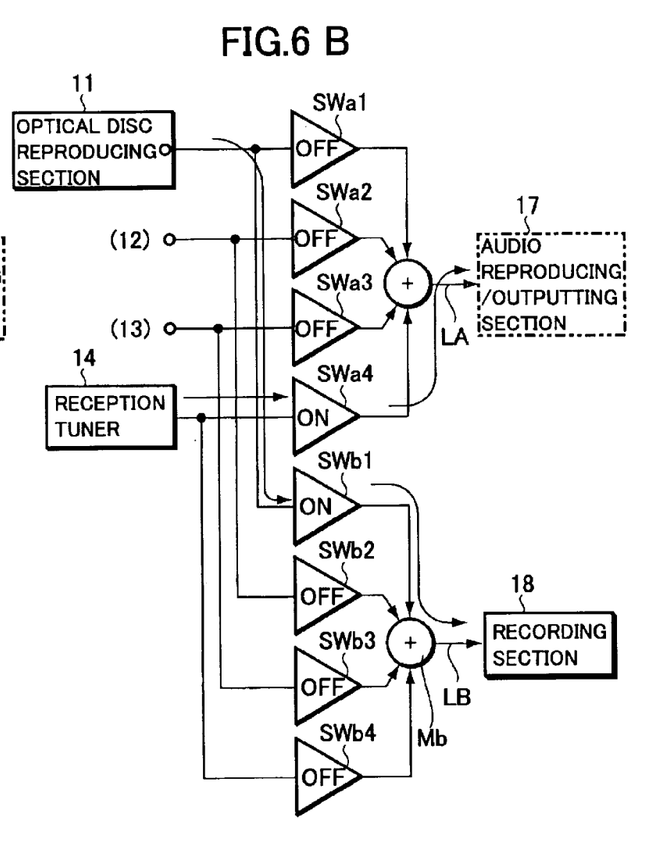
FIG. 6A and FIG. 6B are block diagrams each showing a switchover operation performed when there is an interrupt request.

At step S200, as shown in FIG. 6B, among the switching elements SWa1–SWa4 of the switching circuit SWA, only the switching element SWa4 connected with an information source (the reception tuner 14 issuing an interrupt request) becomes ON, while the switching elements SWb1–SWb4 of the switching circuit SWB are kept unchanged. As a result, the audio information transmitted from the optical disc reproducing section 11 will stop to be supplied to the audio reproducing/outputting section 17. Instead, an audio information (RDS information) transmitted from the reception tuner 14 is supplied to the audio reproducing/outputting section 17 via the switching element SWa4, thereby providing the user with an effective RDS information such as traffic information. Further, since the audio information transmitted from the optical disc reproducing section 11 can be supplied to the recording section 18 without any interruption, it is possible to continue the recording of the audio information without being unfavorably affected by the interrupt request.

Then, at the step S202, it is determined whether the recording of the audio information in the recording section 18 has been finished. If a result is NO, the program proceeds to step S204. At this time, a connection between the optical disc reproducing section 11 and the recording section 18, as well as a connection between the reception tuner 14 and the audio reproducing/outputting section 17, are all kept unchanged so as to continue the reproducing of RDS information in the audio reproducing/outputting section 17 and the recording of the audio information in the recording section 18.

Next, at step S206, it is determined whether the reception tuner 14 (an information source issuing an interrupt request) has finished receiving the RDS electric wave and whether the outputting of RDS information has been stopped. If RDS information has not yet been outputted (NO), the process beginning with the step S202 is repeated. On the other hand, if the outputting of RDS information has been stopped (YES), the program proceeds to step S208.

At the step S208, the switching elements SWa1–SWa4 and the switching elements SWb1–SWb4 are returned back to their former states existing prior to the occurrence of the interrupt request (shown in FIG. 6A), all in accordance with the switchover state data recorded in the storage memory. In this way, the connection between the reception tuner 14 and the audio reproducing/outputting section 17 is shut off, while the optical disc reproducing section 11 and the audio reproducing/outputting section 17 are again connected with each other, thereby allowing the apparatus to return back to its former state in which an audio information transmitted from the optical disc reproducing section 11 is reproduced/outputted in the audio reproducing/outputting section 17. At this time, since the switching elements SWb1–SWb4 close to the recording section 18 are kept unchanged, the recording section 18 is allowed to continue the recording of the audio information transmitted from the optical disc reproducing section 11.

Then, at the step S210, it is determined whether the recording of the audio information in the recording section 18 has finished. If NO, the process beginning with the step S106 (shown in FIG. 4) is continued. On the other hand, if it is determined that the recording of the audio information in the recording section 18 has finished (YES), the process beginning with the step S112 (shown in FIG. 4) is continued. Finally, reproducing by virtue of the optical disc reproducing section 11 and the recording by virtue of the recording section 18 are terminated.

In this way, with the use of the switchover device 19, it is allowed to obtain the following advantages. Namely, during a process in which an audio information transmitted from one information source (such as the optical disc reproducing section 11) is reproduced/outputted in the audio reproducing/outputting section 17 and at the same time recorded in the recording section 18, once there is an interrupt request from another information source (such as the reception tuner 14), it is possible to perform an appropriate switchover so that an audio information from an information source issuing the interrupt request may be reproduced/outputted in the audio reproducing/outputting section 17 while at the same time allowing the continuation of the recording in the recording section 18. Therefore, it is possible to provide the user with an audio information from an information source issuing the interrupt request, without bringing about any unfavorable influence to the recording operation being carried out in the recording section 18. Therefore, it is possible for user to obtain an improved convenience. Especially, if such switchover device is used in a car audio apparatus, it is sure to provide an excellent advantage in obtaining RDS information.

Further, since the switching elements SWa1–SWa4 and the switching elements SWb1–SWb4 can automatically return to their former states (existing prior to the occurrence of an interrupt request), once the interrupt request is terminated, it is sure to dispense with a troublesome operation in which the switching elements SWa1–SWa4 and SWb1–SWb4 (forcibly changed-over in accordance with the interrupt request) have to be operated to return back to their former states, thereby ensuring an improved convenience for a user.

Although the above description has been given to explain an example in which switchover is performed between the optical disc reproducing section 11 and the reception tuner 14 as well as between the audio reproducing/outputting section 17 and the recording section 18, the principle of the present invention is also suitable for use in the case where the MD reproducing section 12 and the cassette reproducing section 13 are employed as information sources, thereby obtaining the same effect.

Further, although the above description has been focused on an embodiment in which the connections between the plurality of information sources as well as between the information processing devices may be switched over by using the switching elements SWa1–SWa4 and SWb1–SWb4, it is also possible to use mute circuits in place of the above-described switching elements. Namely, the mute circuits may be used in a manner such that its ON state can interrupt the passing of an audio information and its OFF state allows the passing of the same, thereby ensuring the same effect as would be obtained by using the switching elements.

In addition, according to the present embodiment, during a process in which an audio information transmitted from one information source (such as the optical disc reproducing section 11) is reproduced/outputted in the audio reproducing/outputting section 17 and at the same time recorded in the recording section 18, once there is an interrupt request from another information source (such as the reception tuner 14), the information source (the optical disc reproducing section 11) connected with the audio reproducing/outputting section 17 is shut off. At this time, only an audio information transmitted from an information source (reception tuner 14) issuing the interrupt request is supplied to the audio reproducing/outputting section 17. However, this should not form any limitation to the present invention. In fact, it is also possible that an audio information transmitted from one information source (such as the optical disc reproducing section 11) connected with the audio reproducing/outputting section 17 before the occurrence of an interrupt request, as well as an audio information transmitted from an information source (the reception tuner 14) issuing the interrupt request, can all be supplied to the audio reproducing/outputting section 17, thereby effecting an audio reproducing of the two kinds of audio information.

For example, the switching elements SWa1–SWa4 and SWb1–SWb4 may be formed into gain-variable mute circuits, so that once there is an interrupt request, the signal level of the interrupt request is compared with the signal level of an audio information transmitted from an information source (the reception tuner 14) issuing the interrupt request. At this time, an audio information transmitted from one information source (such as the optical disc reproducing section 11) connected with the audio reproducing/outputting section 17 before the occurrence of an interrupt request, is attenuated in its signal level and then supplied to the audio reproducing/outputting section 17.

The above embodiment may be better understood with reference to FIG. 6A and FIG. 6B. In the case where an interrupt request is issued in a manner shown in FIG. 6A, if the gain of a mute circuit in place of the switching element SWa1 shown in FIG. 6B is made smaller than the gain of another mute circuit in place of the switching element SWa4, an audio information transmitted from the optical disc reproducing section 11 may be supplied to the audio reproducing/outputting section 17 with its signal level being low controlled. In this way, the audio reproducing/outputting section 17 can audio-reproduce/output, at a low voice, the audio information transmitted from the optical disc reproducing section 11. On the other hand, an audio information (RDS information) transmitted from the reception tuner 14 is audio-reproduced/outputted at a relatively larger and clear voice. Therefore, it is allowed to ensure an advantage that when a user is listening to a useful information such as traffic information, the recording section 18 can continue its recording of an audio information transmitted from the optical disc reproducing section 11.

Although the above description has been made to explain examples showing that the switchover device of present invention is suitable for use in an audio apparatus, it is also possible that the same device may be used in other electronic apparatus. For example, such switchover device can be suitably used with a personal computer equipped with a CD drive, a DVD drive, a floppy disc drive, an MD drive, an MO drive, a hard disk drive and the like, provided that these drive devices are used as information sources and information processing devices for Xeroxing and recording. In this way, it is possible to exactly prevent a malfunction which mistakenly records data from a device issuing an interrupt request.

With the use of the switchover device formed according to the present invention, it is allowed to obtain the following advantages. Namely, during a process in which an information transmitted from one information source is supplied to the plurality of information processing devices, once there is an interrupt request for supplying an information transmitted from another for information source to the information processing devices, the switchover connection device is controlled to continue the supply of the information to an information processing device connected with the second output terminal, while an information processing device connected with the first output terminal is switched over to said another information source. Therefore, in the case where the switchover device of the present invention is used in an electronic apparatus having an information processing device for processing new information in accordance with an interrupt request, also having an information processing device which does not change information (to be processed) even if there is an interrupt request, thereby making it possible to perform an appropriate switchover control.

Although the switchover device of the present invention is suitable for use in various electronic apparatus, it is particularly effective for solving the aforementioned problem associated with the above-described conventional audio apparatus. Namely, using the switchover device of the invention can solve the problem of having to choose only one operation, i.e., either to continue recording by giving up listening to RDS information, or listen to RDS information by giving up recording, which is an undesired situation. In more detail, according to the present invention, an audio reproducing/outputting section is connected to the first output terminal, while the second output terminal is connected with the recording section for recording information on CD, DVD and MD, thereby making it possible to reproduce/output RDS information in the audio reproducing/outputting section while at the same time continuing the recording in the recording section, thus obtaining an improved convenience for a user.

Further, once the interrupt request is cancelled, the switchover connection device can be returned back to its former state (a state existing prior to the occurrence of the interrupt request), thereby making it possible to dispense with a troublesome operation for resetting a switchover connection state for the switchover connection device.

The information recording/reproducing apparatus of the present invention is equipped with the switchover device having the above-described constitution. In particular, an information processing device connected with the first output terminal is an audio reproducing/outputting device for audio-reproducing/outputting an information, an information processing device connected with the second output terminal is a recording device for recording an information, an information source in relation with an interrupt request is a signal reception device. Therefore, during a process in which an information transmitted from a certain information source is audio-reproduced/outputted in an audio reproducing/outputting device and at the same time recorded by virtue of a recording device, once the reception device receives RDS information, such RDS information may be reproduced/outputted by the audio reproducing/outputting device, thereby allowing the recording device to continue the recording of the information transmitted from said certain information source. In this way, it is possible to provide the user with an improved information recording/reproducing apparatus having an improved convenience.

While the invention has been described in conjunction with preferred specific embodiment thereof, it will be understood that this description is intended to illustrate and not limit the scope of the invention, which is defined by the following claims.

What is claimed is:

1. A switchover device for effecting a switchover control among a plurality of information sources as well as among a plurality of information processing devices, such that information transmitted from the plurality of information sources are supplied to the plurality of information processing devices in a predetermined manner, the switchover device comprising:

a plurality of input terminals connected with the plurality of information sources;

a first output terminal and a second output terminal connected with the plurality of information processing devices;

switchover connection devices for controlling the switchover connection between the plurality of input terminals on one hand and the first, second output terminals on the other; and a switchover control device for controlling the switchover of the switchover connection devices;

wherein during a process in which an information transmitted from one information source is supplied to the plurality of information processing devices, once there is an interrupt request for supplying an information transmitted from another information source to the information processing devices, the switchover control device operates to control switchover connection device to stop supplying information between the first output terminal and one input terminal connected with said one information source, and to enable supplying information between the first output terminal and another input terminal connected with said another information source, further to keep supplying information between the second output terminal and an input terminal connected with said one information source.

2. The switchover device according to claim 1, wherein the switchover control device has a memory for storing a switchover connection state of the switchover connection device when one information transmitted from said one information source is supplied to the plurality of information processing devices, and is provided such that once the interrupt request is cancelled, the switchover control device operates to return the switchover connection device to its former state (a state existing prior to the occurrence of the interrupt request) in accordance with a switchover connection state stored in the memory.

3. An information recording/reproducing apparatus equipped with a switchover device recited in claim 1, wherein an information processing device connected with the first output terminal is an audio reproducing/outputting device for audio-reproducing/outputting an information, an information processing device connected with the second output terminal is a recording device for recording an information, an information source in relation with an interrupt request is a signal reception device.

* * * * *